United States Patent
Vyssotski et al.

(10) Patent No.: US 7,747,878 B2
(45) Date of Patent: Jun. 29, 2010

(54) SYSTEM AND METHOD FOR REDUCTION OF INFORMATION HANDLING SYSTEM POWER STATE TRANSITION OF AUDIBLE NOISE

(75) Inventors: Nikolai V. Vyssotski, Elgin, TX (US); Vinh X. Bui, Round Rock, TX (US); Daniel W. Kehoe, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 1331 days.

(21) Appl. No.: 11/221,076

(22) Filed: Sep. 6, 2005

(65) Prior Publication Data
US 2007/0053525 A1    Mar. 8, 2007

(51) Int. Cl.
G06F 1/00 (2006.01)
G06F 1/26 (2006.01)
G06F 1/32 (2006.01)
F02P 3/02 (2006.01)

(52) U.S. Cl. .............. 713/300; 713/320; 713/323; 323/371

(58) Field of Classification Search .......... 713/300, 713/320, 323; 323/371
See application file for complete search history.

(56) References Cited

U.S. PATENT DOCUMENTS

| 5,272,382 | A | 12/1993 | Heald et al. ............... 307/66 |
| 5,332,927 | A | 7/1994 | Paul et al. ............... 307/66 |
| 5,424,678 | A | 6/1995 | Heyl et al. ............... 330/51 |
| 6,553,501 | B1 * | 4/2003 | Yokoe ............... 713/320 |
| 7,430,673 | B2 * | 9/2008 | Kardach et al. ............ 713/300 |
| 7,472,289 | B2 * | 12/2008 | Rodriguez et al. ......... 713/300 |
| 7,552,246 | B2 * | 6/2009 | Mahany et al. ............ 710/18 |
| 2004/0034806 | A1 * | 2/2004 | Klug et al. ............ 713/320 |
| 2004/0181700 | A1 * | 9/2004 | Katoh et al. ............ 713/300 |

* cited by examiner

*Primary Examiner*—Ji H Bae
(74) *Attorney, Agent, or Firm*—Hamilton & Terrile, LLP; Robert W. Holland

(57) ABSTRACT

Audible noise related to power state transitions of an information handling system processing component, such as the central processing unit, is reduced by randomizing the time between power state transitions. Random power state transitions are managed by an operating system module that tracks the transitions and selects random times for subsequent transitions within a predetermined time range. Alternatively, an arbitrating circuit intercepts power state transition commands and arbitrates their communication at random times. Random power state transitions reduces audible noise by spreading the frequency of the noise-causing power transition events over a wider band.

14 Claims, 3 Drawing Sheets

SYSTEM AND METHOD FOR REDUCTION OF INFORMATION HANDLING SYSTEM POWER STATE TRANSITION OF AUDIBLE NOISE

BACKGROUND OF THE INVENTION

1. Field of the Invention

The present invention relates in general to the field of information handling system audible noise, and more particularly to a system and method for reduction of information handling system audible noise related to power state transitions.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have grown in number, the cumulative power consumed by individual systems has become a growing concern. Industry and environmental groups have worked to decrease power consumption by generating and using a number of power conservation steps, such as automated power downs of systems and displays after periods of nonuse. Power conservation initiatives have naturally focused on information handling system components that consume greater amounts of power and especially on components having operational settings with variable power consumption. For example, a common power conservation technique is to throttle the central processing unit (CPU) to a variety of power saving states. The CPU is typically capable of transitioning dynamically between a fully active state and one or more different "sleep" states in a manner that is generally seamless to the user of the system. Throttling of a CPU between a variety of power saving states is particularly attractive with portable information handling systems when operating on an internal battery power source. When a portable system detects an idle state, throttling of the CPU is accomplished with minimal impact on the user of the system, thus increasing the time of the battery life between recharges.

One difficulty that arises from the frequent transition between various CPU power states is that each transition tends to generate audible noise due to the peso-electric effect that accompanies changes in power applied to the CPU. The peso-electric effect results when sudden changes to CPU core voltages change the linear dimensions of ceramic capacitors used to decouple power rails. Changes in the linear dimensions of capacitors translates into board vibrations which are sometimes perceived by a user as a high-pitched audible noise. Typically, transitions between CPU power states occur at regular intervals, usually at 1 mS intervals, so that harmonics from these transitions produce a squealing noise that is annoying to users and sometimes perceived by users as a failing system. One way to minimize the audible noise is to replace the ceramic capacitors with POSCAPS that do not experience the peso-electric effect. However, POSCAPS are typically five times as expensive as ceramic capacitors and a typical CPU power regulator uses four to six of these capacitors. Other alternatives to reduce noise include mechanical modifications to the information handling system housing to reduce noise effects and masking entry into power saving states until a fixed timer expires, however, these techniques generally have an inadequate impact on the noise.

SUMMARY OF THE INVENTION

Therefore a need has arisen for a system and method which effectively reduces noise associated with information handling system power state transitions.

In accordance with the present invention, a system and method are provided which substantially reduce the disadvantages and problems associated with previous methods and systems for reducing noise associated with information handling system power state transitions. Power state transitions of an information handling system processing component are performed at randomized times to reduce audible noise associated with the power state transitions.

More specifically, an information handling system central processing unit receives power at plural states provided by a power manager, such as software, firmware and hardware components distributed through the operating system and chipset to reduce power applied in accordance with processing demands. The power manager transitions between the plural power states at a regular periodic interval, such as 1 mS resulting in a 1 KHz cycle of audible noise generated by power rails that provide the power at the variable power states. An audible noise reduction module randomizes the power timing of the power state transitions within a predetermined time period, such as 0.8 to 2 mS, so that audible noise is reduced by spreading the audible noise across a wider frequency spectrum. In one embodiment, the audible noise reduction module is a software module associated with the operating system that randomizes power transition requests sent by the operating system. In an alternative embodiment, audible noise reduction module is an arbitration circuit that selectively arbitrates communication of power transition commands from the chipset of the information handling system to achieve increased randomization of the power transition commands.

The present invention provides a number of important technical advantages. One example of an important technical advantage is that audible noise associated with information handling system power state transitions is reduced with minimal impact on system performance. Audible noise is reduced by expanding the bounds of the timing of the power state transitions, such as a range of 0.8 to 2 mS instead of the typical 1 mS value, to spread the spectrum of noise over a wider frequency band as opposed to the typical 1 KHz frequency. Increasing the bounds of the timing of power state transitions has some minimal impact on battery life, however the impact is minimal, such as a decrease of ten minutes of life for a five hour battery in one embodiment.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Randomization of power state transitions of an information handling system processing component reduces audible noise related to the power state transitions by spreading the frequency of the noise over an increased spectrum. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
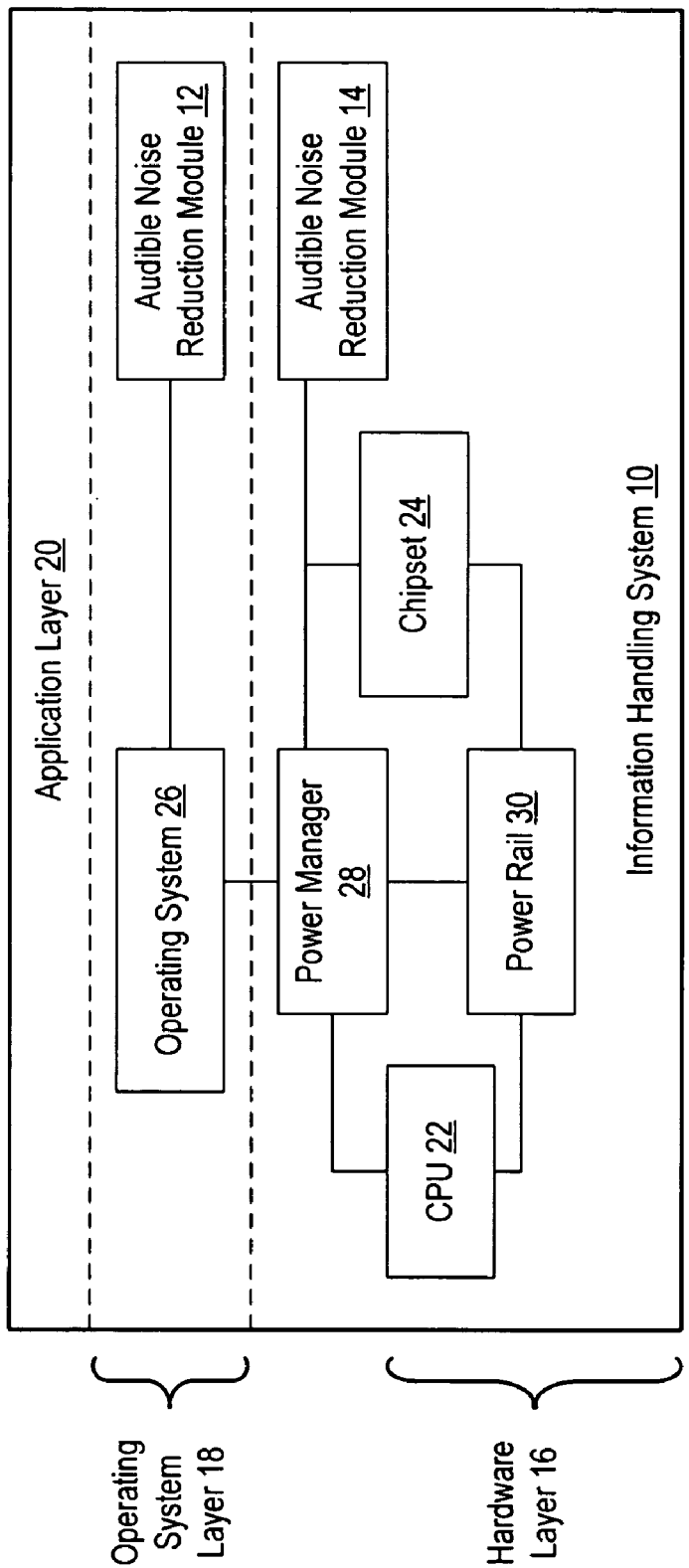
FIG. 1 depicts a block diagram of an information handling system having software and hardware audible noise reduction modules.

Referring now to FIG. 1, a block diagram depicts an information handling system 10 having a software audible noise reduction module 12 and a hardware audible noise reduction module 14. Information handling system 10 processes information at a hardware layer 16, an operating system layer 18 and an application layer 20. Hardware layer 16 includes plural processing components, such as a central processing unit (CPU) 22 and a chipset 24. Operating system layer 18 includes an operating system 26 that coordinates the operation of the hardware components to perform tasks for applications running in application layer 20. A power manager 28 associated with operating system 26 monitors the activity level of central processing unit 22 and, at regular periodic intervals such as every millisecond, power manager 28 adjusts the power state of central processing unit 22, thus altering the power communicated across power rail 30. Power manager 28 includes firmware and software instructions running in operating system 26 and on chipset 24 which adjusts the power state of central processing unit 22 in accordance with the processing demands of applications in use on information handling system 10, with more processing intensive applications consuming greater power and idle use consuming reduced power. The one millisecond (1 mS) power state adjustment interval generates a 1 KHz audible noise from power rail 30 as capacitors associated with power rails 30 adjust to changes in power consumption.

Figure 2:
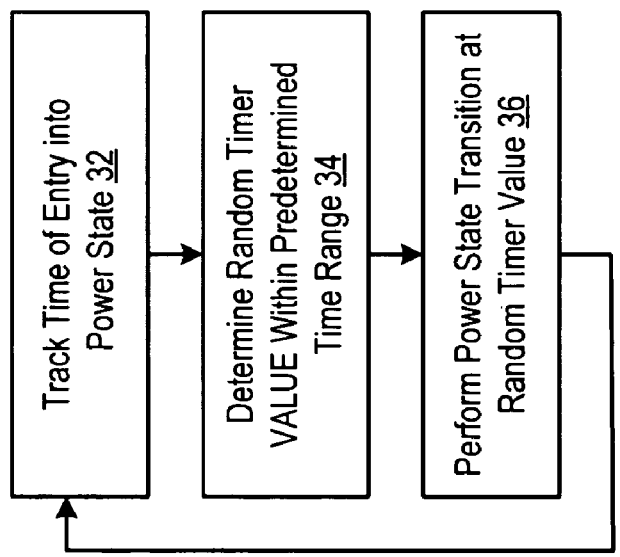
FIG. 2 depicts a flow diagram of a process for randomizing an information handling system processing component's power state transitions.

The audible noise output by power rail 30 is dampened with either the software audible noise reduction module 12 or the hardware audible noise reduction module 14 by expanding the time range over which power state transitions occur, such as a range of 0.8 to 2 mS instead of a regular 1 mS interval. Audible noise is reduced as the spectrum of noise from power rail 30 is spread over a wider frequency band. The software audible noise reduction module 12 operates as module associated with operating system 26 that sets random times for operating system 26 to allow power state transitions by power manager 28. Referring now to FIG. 2, a flow diagram depicts one embodiment of a process for audible noise reduction module 12 to randomize an information handling system's processing component's power state transitions. The process begins at step 32 by tracking the time of entry into a power state, such as the value in a timer maintained by audible noise reduction module 12. At step 34 a random timer value is determined for the next power state transition to occur, such as value within a range of 0.8 to 2 mS from the last power state transition. In one embodiment, the random time value is compared against the last time value to ensure that the power transition times will have adequate time spreads. In an alternative embodiment, experimentation is use to determine time values having greater noise reduction, such as based on the harmonics of the noise within the information handling system. At step 36, the power state transition is performed at the random timer value and the process returns to step 32 to track the time of entry into the power state.

Figure 3:
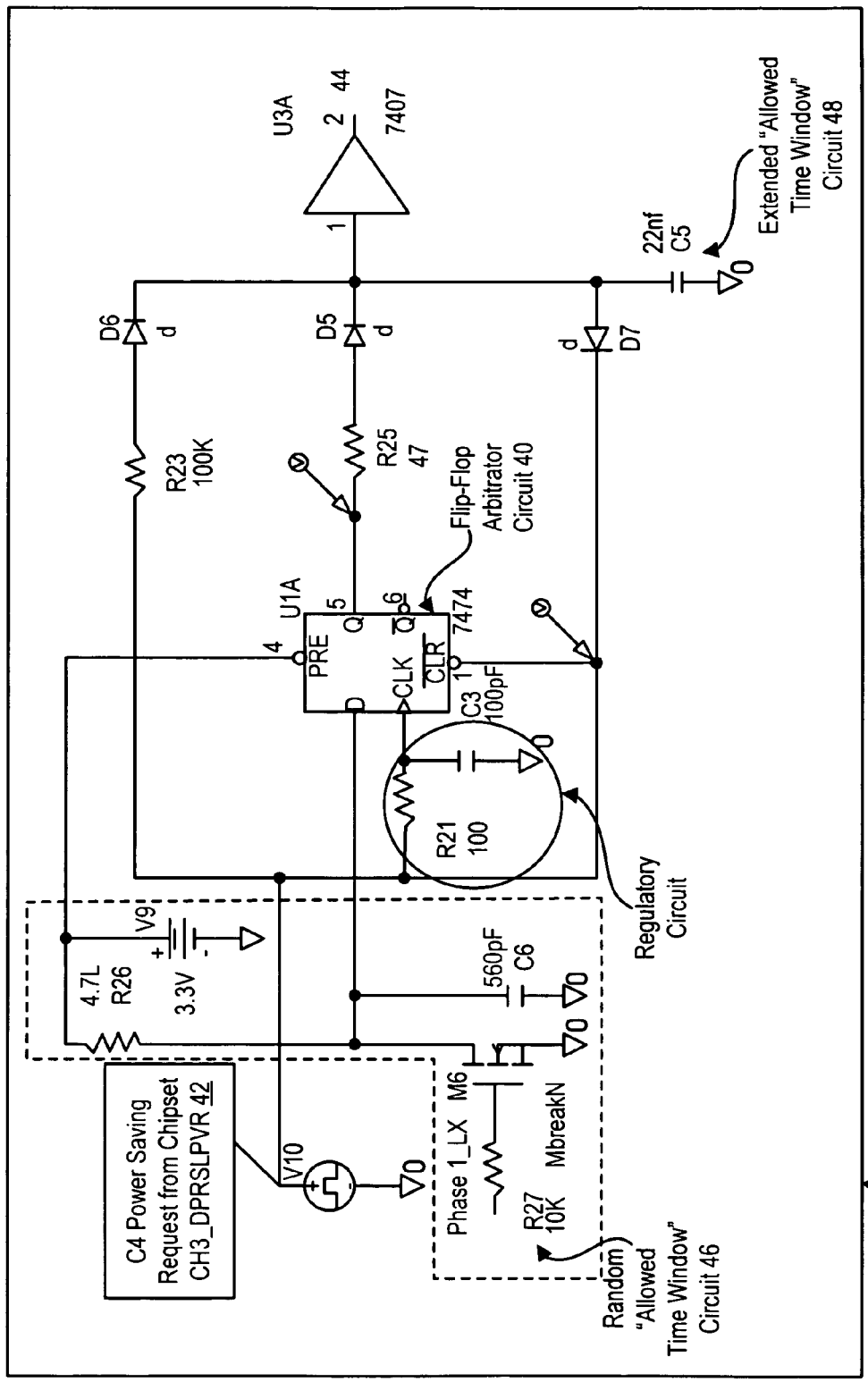
FIG. 3 depicts a circuit diagram of an arbitrator module that selectively communicates power state transition commands.

Referring now to FIG. 3, a circuit diagram depicts an arbitrator module 38 that selectively communicates power state transition commands for audible noise reduction module 14. A flip flop arbitrator 40 selectively communicates C4 power saving request inputs 42 from chipset 24, called CH3_DRRSLPVR, to the power regulator for CPU 22. Flip flop arbitrator 40 only allows power transition requests to propagate from input 42 to output 44 if the request arrives in an "allowed time window" set by a random allowed time window circuit 46. The duration of an allowed time window is randomly set by the duty cycle R26 and C6 of circuit 46 using the switching node LX of the power regulator as the gating signal since the regulator switching frequency is random with respect to the generation of power transition commands at input 42. If a power transition request is denied by flip flop arbitrator 40 as having arrived outside of the allowed time, the power transition request may still be communicated by an extended allowed time window circuit 48 if the request is asserted for a long enough time to allow capacitor C5 to charge through resistor R23. This allows for delayed entry into a power saving state to ensure that power savings are still achieved under appropriate circumstances. The duty cycle and therefore probability of allowing a request to occur is set by selecting the R and C values.

Although the present invention has been described in detail, it should be understood that various changes, substitutions and alterations can be made hereto without departing from the spirit and scope of the invention as defined by the appended claims.

What is claimed is:

1. An information handling system comprising:
   a central processing unit;
   a power source operable to power the central processing unit at plural power settings;

a power manager interfaced with the central processing unit and the power source, the power manager operable to adjust the power setting of the central processing unit at periodic intervals; and an audible noise reduction module interfaced with the power manager and operable to alter the periodic interval to adjust the power setting at irregular intervals;

wherein the periodic intervals comprise intervals of substantially 1 mS.

2. The information handling system of claim 1 wherein the irregular intervals comprise random values of between 0.8 and 2 mS.

3. The information handling system of claim 1 wherein the power manager comprises an operating system and the audible noise reduction module comprises a module of instructions associated with the operating system and operable to alter the periodic interval to random time intervals.

4. An information handling system comprising:
a central processing unit;
a power source operable to power the central processing unit at plural power settings;
a power manager interfaced with the central processing unit and the power source, the power manager operable to adjust the power setting of the central processing unit at periodic intervals; and
an audible noise reduction module interfaced with the power manager and operable to alter the periodic interval to adjust the power setting at irregular intervals;
wherein the power manager comprises an operating system and the audible noise reduction module comprises a module of instructions associated with the operating system and operable to:
track the time of a previous power state adjustment;
determine a time for the next power state adjustment, the determined time different than the time of the previous power state adjustment; and
direct the power state adjustment at the determined time.

5. An information handling system comprising:
a central processing unit;
a power source operable to power the central processing unit at plural power settings;
a power manager interfaced with the central processing unit and the power source, the power manager operable to adjust the power setting of the central processing unit at periodic intervals; and
an audible noise reduction module interfaced with the power manager and operable to alter the periodic interval to adjust the power setting at irregular intervals;
wherein the audible noise reduction module comprises an arbitration circuit disposed between the power manager and the central processing unit, the arbitration circuit arbitrating power adjustment commands to have random communication to the central processing unit;
wherein the arbitration circuit comprises:
a flip flop arbitrator that selectively allows or denies a power adjustment; and
a time window circuit allowing a chosen-percentage chance of allowing a flip-flop arbitrator to allow or deny a power adjustment.

6. The information handling system of claim 5 further comprising an extended allowed time window circuit interfaced with the flip flop arbitrator and operable to selectively override a denied power adjustment.

7. A method for reducing audible noise associated with power state transitions of an information handling system processing component, the method comprising:
initiating a first power state transition;
determining a random time, the random time within predetermined range; and
initiating a second power state transition at the random time;
wherein initiating a first power state transition further comprises initiating a power state transition of a central processing unit;
wherein determining a random time further comprises:
intercepting commands to initiate a power state transition; and
selectively allowing or denying communication of the commands;
wherein intercepting commands further comprises communicating the commands through a flip flop and wherein selectively allowing or denying communication further comprises setting a random allowed time window during which the flip flop allows communication of the commands.

8. The method of claim 7 wherein:
initiating a first power state transition further comprises managing power state transitions with an operating system running on the information handling system; and
determining a random time further comprises using the operating system to determine random times to initiate power state transitions.

9. The method of claim 7 wherein determining a random time further comprises:
selectively delaying communication of the commands.

10. A system for reducing audible noise associated with power state transitions of an information handling system processing component, the system comprising:
a power manager operable to transition the processing component between plural power states over an operating time; and
an audible noise reduction module interfaced with the power manager and operable to randomize the time between the transitions of the processing component to the power states;
wherein the audible noise reduction module comprises an operating system module operable to track the time of a power state transition, select a random time for the next power state transition to occur within a predetermined time range, and manage the power state transition at the random time.

11. The system of claim 10 wherein the information handling system processing component comprises a central processing unit.

12. The system of claim 10 wherein the predetermined time range is approximately 0.8 to 2 mS.

13. The system of claim 10 wherein the audible noise reduction module comprises an arbitration circuit operable to intercept a power state transition command and selectively communicate the command at a random time.

14. The system of claim 13 wherein the arbitration circuit comprises a flip flop that allows communication of the power state transition during random allowed time windows.

* * * * *